United States Patent

[11] 3,552,552

| [72] | Inventor | Douglas Johnston<br>Athens, Ala. |
|---|---|---|
| [21] | Appl. No. | 745,508 |
| [22] | Filed | July 17, 1968 |
| [45] | Patented | Jan. 5, 1971 |
| [73] | Assignee | Decatur Foundry & Machine Co., Inc.<br>Decatur, Ala.<br>a corporation of Alabama |

[54] ROD-TYPE SCREEN FOR SUSPENSION FERTILIZERS
6 Claims, 7 Drawing Figs.

[52] U.S. Cl. .................................................. 210/447,
210/454, 210/497
[51] Int. Cl. .................................................. B01d 35/28,
B01d 41/04
[50] Field of Search .................................... 210/435,
440, 447, 453, 498, 499, 452, 454

[56] References Cited
UNITED STATES PATENTS
828,715   9/1906   Cook ............................. 210/499X

| 2,049,336 | 10/1934 | Stine ............................. | 210/499X |
| 2,081,198 | 5/1937 | Hahn ............................. | 210/454X |
| 2,346,885 | 4/1944 | Williams et al. ............... | 210/499X |
| 2,792,120 | 5/1957 | Tinker ........................... | 210/453X |

*Primary Examiner*—Reuben Friedman
*Assistant Examiner*—T. A. Granger
*Attorney*—Kingsland, Rogers, Ezell, Eilers & Robbins ABSTRACT: A liquid fertilizer strainer screen for efficiently screening suspension fertilizers to prevent clogging of nozzles and orifices handling the fertilizer comprising a plurality of small diameter rods equispaced about one-sixteenth of an inch apart mounted at each end in nylon rings to form a cylinder, said rods being reinforced substantially midway by a band of nylon that extends around the outside of the rods. The screen is disposed at an angle within and is a part of a fertilizer strainer, which also includes a casing adapted to be disposed in a liquid fertilizer line for straining the fertilizer as it passes through the screen.

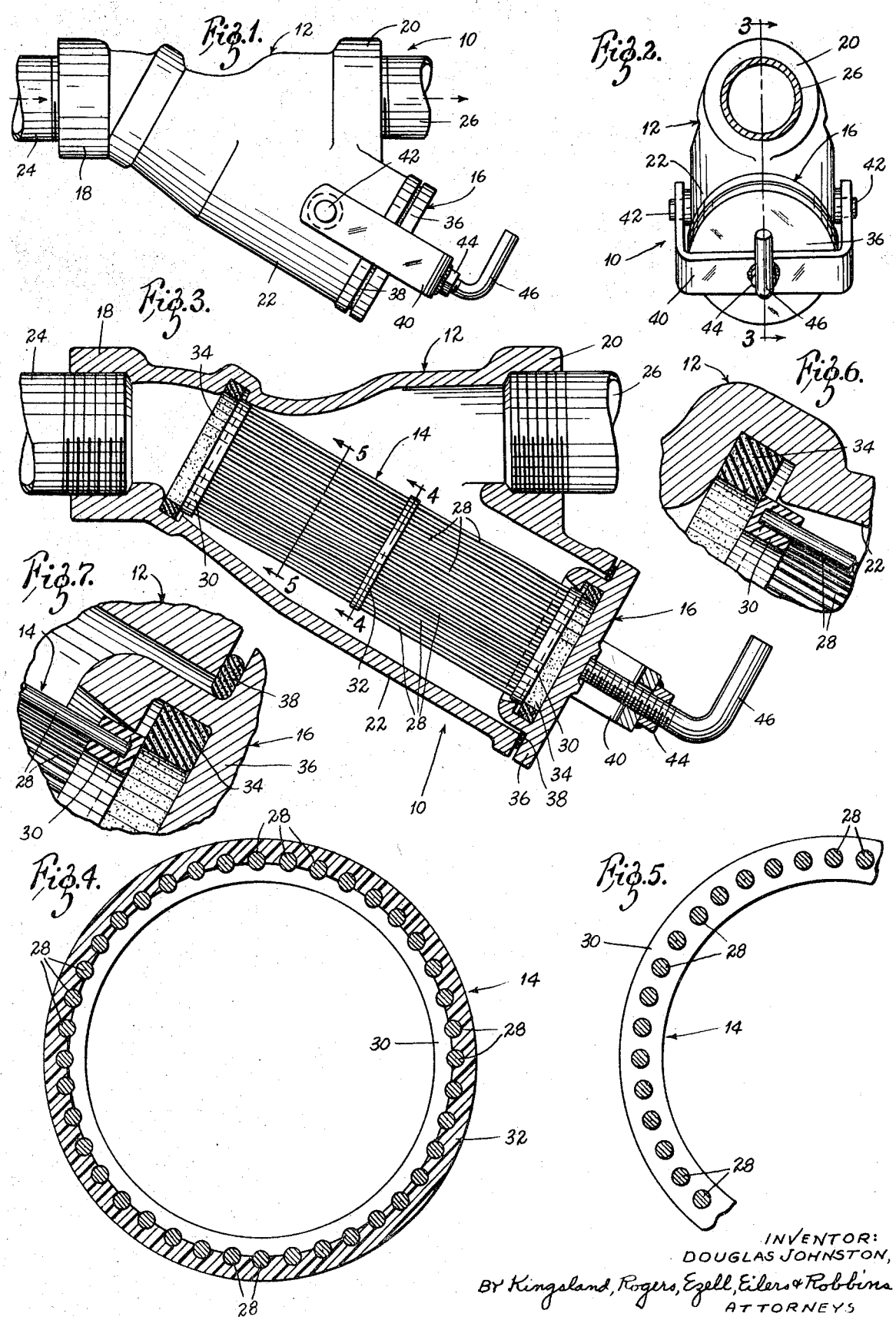

3,552,552

ROD-TYPE SCREEN FOR SUSPENSION FERTILIZERS

BACKGROUND OF THE INVENTION

1. Field of the Invention

The present invention relates generally to the strainer art, and more particularly to a novel screen and strainer including the screen for straining liquid fertilizers, especially suspension fertilizers.

2. Description of the Prior Art

In the applicant's knowledge, there is no strainer in the fertilizer industry which successfully strains suspension fertilizers for more than a very brief period of time. In fact the entire fertilizer industry has been anxiously awaiting a screen that can be used with the suspension-type fertilizers, as no strainers or screens presently available are satisfactory, because they clog up or bridge over. Suspension fertilizers are relatively new. It is very likely that they will largely replace granular fertilizers and liquid solution fertilizers.

A word about suspension fertilizers is in order. If we should take, say, 100 pounds of granular fertilizer materials, such ammonium nitrate crystals, ammonium phosphate crystals, and potassium chloride crystals, and dissolve them in 300 gallons of water, we would have a solution fertilizer, as the water would be sufficient to completely dissolve all of the crystals and make a clear solution, free of solid matter, and all of the materials would remain in solution until such a time as the temperature got below the "salting out temperature," at which point some of the crystals would precipitate. Normally, however, the concentration of salt in the water is held low enough so that no salting out occurs during normal operation conditions.

If, on the other hand, instead of adding 300 gallons of water to the 100 pounds of crystals, we added only 3 or 4 gallons of water, this would only dissolve perhaps a few percent of the crystals and the remainder would continue as solid particles in a saturated solution, and if this mixture were stirred up thoroughly and allowed to stand overnight, the crystals would solidify at the bottom of the tank and it would take a pickaxe to get the mixture out of the tank. In order to prevent this solidification, about 2 percent of attapulgite clay is added, which serves as a suspending agent. They clay is thoroughly mixed in with the suspension, coating each crystal, and this tends to make the crystals float in the solution so they will not sink to the bottom for many hours, and if they do sink to the bottom, the clay coating keeps them from solidifying with the other crystals.

The big advantage of suspension fertilizers is the fact that the raw materials can be very impure, containing sand and other impurities. In fact, the impurities are a great advantage because they add such trace elements as manganese, iron, zinc, boron, and many others that most plants do not get in a refined fertilizer.

The plant equipment for manufacturing suspensions is also relatively inexpensive, and it is feasible to immediately produce a tank of fertilizer to any specifications the farmer might like. Suspensions can be compounded with very high concentrations or proportions of plant food, which reduces transportation costs and enables the farmer to carry more plant food in a given size tank than he could with solution-type fertilizers.

Ordinary woven wire screens cannot be used for straining suspensions. The salt crystals in suspensions are of all sizes from a few microns up to perhaps one-eighth of an inch in diameter, and they are mostly square or round in shape, and of all sizes. Large crystals lodge in the cross-wires of an ordinary screen, and the small crystals begin to buildup on a screen until they finally plug it.

One unusual and peculiar characteristic of a suspension is that if you leave it still in a tank, the crystals may take days to settle to the bottom and, as explained above, they do not form a hard mass if coated with clay. On the other hand, if suspension crystals are moving rather rapidly, they will separate out of the liquid and adhere to each other if an obstruction is encountered and will continue to buildup.

The present novel screen and strainer including the screen satisfy this need of the fertilizer industry.

SUMMARY OF THE INVENTION

In brief, the present novel screen includes a plurality of straight rods or wires of small diameter maintained in cylindrical form equidistantly apart by rings of nylon, and the like, in which the ends of the rods are mounted. A nylon ring extends around the outsides of the rods about midpoint to strengthen the same. The screen is part of a liquid fertilizer strainer adapted to be incorporated in a liquid fertilizer line, the liquid fertilizer passing through the screen which functions to slide large crystals in the flow downwardly along the rods and into a retainer cap or cup without bridging or clogging.

Objects of the present invention are to provide a novel rod-type screen for liquid fertilizer strainers which is constructed to function for a long period of time without clogging or bridging when suspension fertilizers are passed through the screen, which is of rugged construction to give long wear and continuous service, which will strain out crystals that would clog presently used nozzles or 7/64-inch diameter orifices without clogging or bridging over, and which otherwise fulfills the objects and advantages sought therefor. Further objects are to provide a strainer incorporating the said screen which is adapted to strain crystals and other material from suspension fertilizers that would block or clog nozzles and orifices presently in use, yet without clogging or bridging over in the course of this effective straining action, thereby supplying the serious need of the fertilizer industry.

BRIEF DESCRIPTION OF THE DRAWINGS

FIG. 1 is a side elevational view of a liquid fertilizer strainer incorporating the teachings of the present invention, said strainer being disposed in a fluid fertilizer line, only segments of which are shown for a conservation of space;

FIG. 2 is an end elevation thereof;

FIG. 3 is an enlarged cross-sectional view taken on substantially the line 3–3 of FIG. 2;

FIGS. 4 and 5 are further enlarged transverse cross-sectional views taken on substantially the lines 4–4 and 5–5 of FIG. 3, respectively;

FIG. 6 is a further enlarged fragmentary detail illustrating mounting of the rod ends in the nylon ring; and FIG. 7 is another further enlarged fragmentary detail directed to the cleanout cap.

DESCRIPTION OF THE PREFERRED EMBODIMENT

Referring to the drawing more particularly by reference numerals, 10 indicates generally a liquid fertilizer strainer incorporating the principles of the present invention, which is adapted to prevent clogging of nozzles and orifices handling the fertilizer. The strainer 10 includes a casing 12, a novel screen 14, and a closure assembly 16.

The casing 12 is of the configuration clearly shown in the drawing and includes an inlet portion 18, an outlet portion 20, and a screen reception portion 22. Pipe segments 24 and 26 are threaded into the inlet portion 18 and outlet portion 20, respectively.

The screen 14 comprises a plurality of straight rods or wires 28 of small diameter, such as one-sixteenth of an inch, which gives strength and a good total open space, equispaced, such as about one-sixteenth of an inch apart, and maintained in cylindrical form by end rings 30 of nylon, and the like, and a center external nylon ring 32. The rods 28 should be as small as possible in diameter in order to obtain the maximum open area through the screen 14, but large enough to give strength and rigidity to the screen 14. The space between the rods 28 is determined by the smallest diameter nozzle or orifice handling the fertilizer, it being necessary to correlate the orifices or nozzles and rod 28 spacing to the largest normal crystals of the suspension fertilizer used. As is clear from FIG. 6, the rods 28 are embedded in the rings 30. The center ring 32 is externally in major part of the rods 28 to reduce to a minimum clogging or buildup in the area of the ring 32 by engagement of crystals, etc. The screen 14 is seated on neoprene washers 34 at each end and is disposed at an angle, as illustrated.

The cap assembly 16 includes a cap member 36 sealed in position by a neoprene ring 38, or the like. A bail 40 is pivotally mounted on the casing 12 by trunnions 42. Conveniently, a nut 44 is welded to the bail 40 and a threaded member 46 is threadedly mounted therein and extends through an opening in the bail 40 to engage the center portion of the cap member 36. Clockwise rotation of the member 46 will firmly force the cap member 36 into position against the neoprene ring 38. Release is effected by rotation of the member 46 in the opposite direction. The right-hand neoprene washer 34 is disposed against the interior of the cap member 36.

As is clear from the foregoing description taken with the accompanying drawing, suspension material enters the strainer 10 from the left through the pipe segment 24 and inlet portion 18 and passes through the screen 14 and on out from the strainer 10 by means of the outlet portion 20 and the pipe segment 16. Large crystals and large foreign material that enter the screen 14 simply slide along the inside of the rods 28 to the bottom of the screen 14 where they are caught in the stainer cap member 36, the capacity of which can be enlarged, if required. The large crystals slide along the inside of the rods 28 due to the velocity of the fluid and to the effect of gravity, since the screen 14 is set at an angle to the horizontal. There is substantially no buildup from small crystals because there are no crosswires for them to impinge on and buildup and bridge the squares as in ordinary woven wire screen. Even if a little buildup occurs at the bottom of the screen 14, there is no clogging, for additional crystals will slide thereover into the cap member 36, as has been demonstrated by extensive tests. It is also important to note that the present screen 14 has a very large straining capacity as compared to other type screens. Should unusual circumstances cause a high percentage of clogging, the screen 14 will continue to handle the normal flow of suspension fertilizers in present agricultural equipment.

It is manifest that there have been provided a liquid fertilizer strainer and a screen which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention.

I claim:

1. In combination, a stainer for screening suspension fertilizers, upflow from discharge means of a dispensing machine, comprising a casing including means for connecting said strainer in a line adapted to receive a flow of suspension fertilizer, and a screen mounted in said casing including a plurality of cylindrical rodlike members and means holding said members in spaced relation permitting flow of suspension fertilizer, therebetween, said rodlike members being spaced-apart a distance substantially the diameter of the orifices of the machine to which said strainer is applied, said screen having an open end adapted to receive a flow of suspension fertilizer, and another end adapted to be disposed out of the normal line of flow of a suspension fertilizer, through said strainer, the inwardly directed surfaces of said rodlike members being free of obstruction from end-to-end to permit suspension fertilizer crystals strained from a flow to slide to the last-mentioned end of the screen.

2. The combination of claim 1 in which said rodlike members are about one-sixteenth of an inch in diameter.

3. A screen for straining suspension fertilizer, being dispensed to soil, comprising a plurality of cylindrical rodlike members, means hold said members in spaced relation permitting flow of suspension fertilizer therebetween, said rodlike members being spaced-apart a distance substantially the diameter of the orifices of the machine to which said strainer is applied, and having an open end adapted to receive a flow of suspension fertilizer, and another end adapted to be disposed out of the normal line of flow of a suspension fertilizer, the inwardly directed surfaces of said rodlike members being free of obstruction from end-to-end to permit suspension fertilizer crystals and other material strained from a flow to slide to the last-mentioned end of the screen.

4. The combination of claim 3 in which said rodlike members are about one-sixteeth of an inch in diameter.

5. The combination of claim 1 and including means supporting said rodlike members between the ends preventing spreading under pressures in use, said supporting means being disposed externally of said screen leaving said rodlike members free of obstruction internally so that crystals and other material strained from a flow can slide to the end of the screen out of the flow.

6. The combination of claim 3 and including means supporting said rodlike members between the ends preventing spreading under pressures in use, said supporting means being disposed externally of said screen leaving said rodlike members free of obstruction internally so that crystals and other material strained from a flow can slide to the end of the screen adapted to be disposed out of the flow.